US006965460B1

(12) United States Patent
Gann et al.

(10) Patent No.: US 6,965,460 B1
(45) Date of Patent: Nov. 15, 2005

(54) METHOD AND SYSTEM FOR SCANNING AN IMAGE USING A LOOK-DOWN LINEAR ARRAY SCANNER

(75) Inventors: Robert G Gann, Bellvue, CO (US); Roland John Burns, Santa Cruz, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 764 days.

(21) Appl. No.: 09/635,479

(22) Filed: Aug. 8, 2000

(51) Int. Cl.[7] ................................................. H04N 1/04
(52) U.S. Cl. ..................... 358/471; 358/474; 358/482; 358/483; 358/494; 358/453
(58) Field of Search ................ 358/471–474, 358/482, 483, 494, 496, 453

(56) References Cited

U.S. PATENT DOCUMENTS

| | | | | |
|---|---|---|---|---|
| 3,912,386 A | * | 10/1975 | Gorog et al. ................ | 348/764 |
| 4,010,601 A | * | 3/1977 | Anahara et al. .................. | 57/6 |
| 4,060,316 A | * | 11/1977 | Pollack et al. ............... | 349/201 |
| 5,214,457 A | * | 5/1993 | Takanashi et al. ............. | 353/31 |
| 5,227,896 A | | 7/1993 | Ozawa et al. ................ | 358/474 |
| 5,343,410 A | | 8/1994 | Tsujiuchi et al. ........... | 364/525 |
| 5,414,481 A | * | 5/1995 | Fujioka et al. .............. | 353/122 |
| 5,428,417 A | * | 6/1995 | Lichtenstein ................ | 353/122 |
| 5,485,041 A | * | 1/1996 | Meister ....................... | 307/10.1 |
| 5,510,830 A | | 4/1996 | Ohia et al. .................... | 348/36 |
| 5,515,181 A | * | 5/1996 | Iyoda et al. ................. | 358/474 |
| 5,528,290 A | | 6/1996 | Saund ......................... | 348/218 |
| 5,548,409 A | | 8/1996 | Ohta et al. ................... | 358/335 |
| 5,625,462 A | | 4/1997 | Ohta et al. ..................... | 386/46 |

(Continued)

FOREIGN PATENT DOCUMENTS

FR    2 785 130    10/1998

OTHER PUBLICATIONS

* * Patent 6,603,582 disclosed above is the U.S. counterpart of FR 2 785 130 previously disclosed in IDS filed Aug. 4, 2003.
Foreign Search Report dated Jul. 3, 2003.
Yamaki, H, et al., "Development of New Banking Terminal"; pp. 106–111.
Canon Visual Communication Systems Document # 4150 dated Dec. 1998.

*Primary Examiner*—Kimberly Williams
*Assistant Examiner*—Negussie Worku

(57) ABSTRACT

A system and method are disclosed which provide a look-down digital imaging device capable of capturing relatively high resolution digital images (e.g., comparable to traditional flatbed scanners). A preferred embodiment provides a look-down digital imaging device comprising a linear sensor for imaging a raster line of an original image placed substantially below the look-down digital imaging device, and a lens for focusing reflected light from the original to such linear sensor. The linear sensor functions much as in traditional flatbed scanners in that it captures a single, congruent digital image of a scanned original. Most preferably, the linear sensor is a high resolution sensor that enables a digital image to be captured having resolution comparable to that of traditional flatbed scanners. For instance, the linear sensor preferably enables capture of a digital image having a resolution no less than approximately 300 dpi. As a result, such linear sensor most preferably captures a digital image having sufficient resolution to permit optical character recognition operations to be performed on such captured image. In a most preferred embodiment, the look-down digital imaging device further comprises a digital video camera for capturing video data of a target scan area. Such video data may be fed in substantially real-time to a display (either included within the look-down digital imaging device or included on a device to which the look-down digital imaging device is coupled), which may aid a user in properly aligning an original within the target scan area.

49 Claims, 4 Drawing Sheets

U.S. PATENT DOCUMENTS

| | | | |
|---|---|---|---|
| 5,818,612 A * | 10/1998 | Segawa et al. | 358/494 |
| 5,883,697 A | 3/1999 | Ohyama | |
| 6,047,130 A * | 4/2000 | Oles | 396/1 |
| 6,115,482 A * | 9/2000 | Sears et al. | 382/114 |
| 6,151,521 A * | 11/2000 | Guo et al. | 600/407 |
| 6,295,388 B1 * | 9/2001 | Stokes et al. | 382/312 |
| 6,342,957 B1 * | 1/2002 | Itoh | 358/527 |
| 6,386,711 B1 * | 5/2002 | Petruchik et al. | 353/122 |
| 6,540,415 B1 * | 4/2003 | Slatter et al. | 396/428 |
| 6,577,339 B1 * | 6/2003 | Thompson et al. | 348/211.14 |
| 6,603,582 B1 | 8/2003 | Cotte et al. | |
| 6,633,689 B2 * | 10/2003 | Yamamoto | 382/309 |

* cited by examiner

```
R R R R R R R R R R R R R R R R
G G G G G G G G G G G G G G G G
B B B B B B B B B B B B B B B B
```

R = RED SENSOR   G = GREEN SENSOR   B = BLUE SENSOR

```
RGRGRGRGRGRGRGRGRGRG
GBGBGBGBGBGBGBGBGBGB
RGRGRGRGRGRGRGRGRGRG
GBGBGBGBGBGBGBGBGBGB
RGRGRGRGRGRGRGRGRGRG
GBGBGBGBGBGBGBGBGBGB
RGRGRGRGRGRGRGRGRGRG
GBGBGBGBGBGBGBGBGBGB
```

R = RED SENSOR   G = GREEN SENSOR   B = BLUE SENSOR

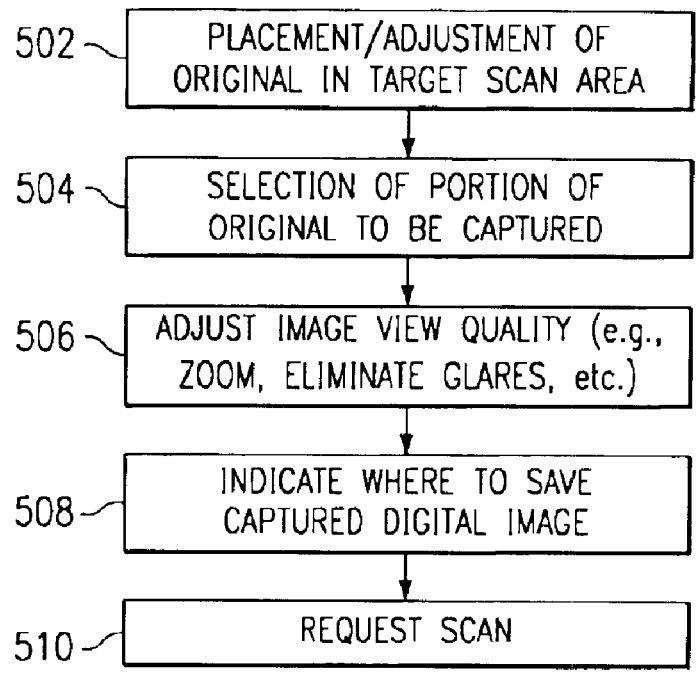
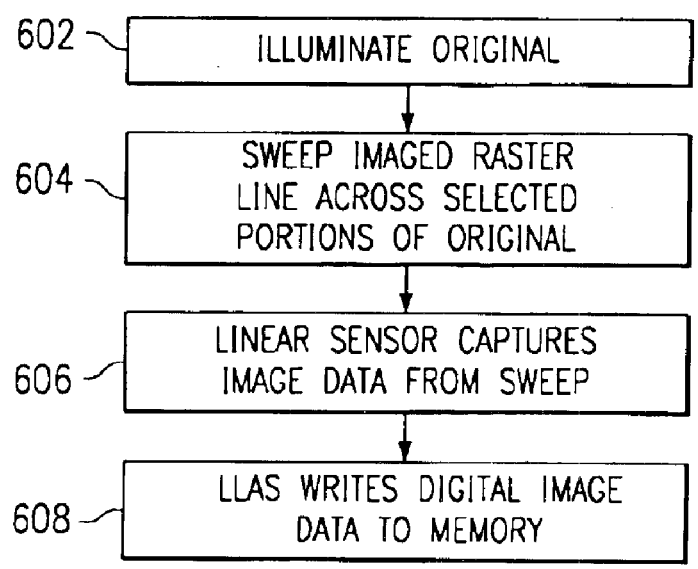

METHOD AND SYSTEM FOR SCANNING AN IMAGE USING A LOOK-DOWN LINEAR ARRAY SCANNER

RELATED APPLICATIONS

This application is related to concurrently filed and commonly assigned U.S. patent application Ser. No. 09/626,625 entitled "METHOD AND SYSTEM FOR CALIBRATING A LOOK-DOWN LINEAR ARRAY SCANNER UTILIZING A FOLDED OPTICAL PATH," the disclosure of which is hereby incorporated herein by reference.

TECHNICAL FIELD

The present invention relates in general to a system and method for imaging the optical image of an original image, and in specific to a method and system for imaging the optical image of an original image utilizing a look-down linear array scanner.

BACKGROUND

Various types of digital image capture (or image reading) devices are available in the prior art. More particularly, various types of image capture devices are available in the prior art for obtaining a digital image of an original image. For example, image capture devices such as scanners (both handheld and flatbed) for personal computers, digital cameras, facsimile machines, and digital copying machines are available in the prior art. As discussed below, digital image capture devices of the prior art typically do not provide convenient, space-efficient means for capturing a digital image with a high resolution. For instance, prior art digital image capture devices are not suitable for space-efficient use on a desktop to capture digital images with sufficient resolution for use in an optical character recognition (OCR) program.

Traditional image capture devices, such as scanners and copying machines, typically include a frame having a platen glass on top thereof on which an original is placed face down for capturing an image of such original. An example of a typical flatbed scanner 100 of the prior art is shown in FIG. 1. As shown, a light source 102 illuminates an original image 104 (e.g., a piece of paper) that is placed face down against a platen glass window 106 positioned above the scanning mechanism (e.g., scan head) 108. In general, blank or white spaces on original 104 reflect more light than do inked or colored letters or images on original 104. Typically, a motor moves scan head 108 beneath original 104, and as it moves, scan head 108 captures light bounced off individual areas of original 104.

The light from original 104 is reflected through a system of mirrors, such as mirrors $110_A$, $110_B$, and $110_C$, that maintain the reflected light beams aligned with a lens 112. Lens 112 focuses the beams of light onto a solid-state image pick-up device (e.g., light-sensitive diodes) 114 that translates the amount of light into an electrical current. More specifically, lens 112 typically focuses the beams of light onto a coupled-charge device (CCD) 114, which converts the light energy (or intensity) into electrical current. Generally, the more light that is reflected (i.e., the greater the intensity), the greater the voltage or current produced. Of course, some digital imaging devices are implemented in a manner such that the greater the intensity of the reflected light the lesser the voltage or current produced. If scanner 100 works with colored images (i.e., is a color scanner), the reflected light is typically directed through red, green, or blue filters (not shown) in front of separate diodes to enable scanner 100 to determine the appropriate color images of original 104. Other color separation methods also exist and are well known in the art. An analog-to-digital converter (ADC) 116 stores each analog reading of voltage as a digital pixel representing the light's intensity for a spot along a line that typically contains 300 to 1,200 pixels to the inch. The digital information (i.e., the captured digital image) may be utilized in a variety of ways thereafter. For instance, the digital information may be sent to software in a PC (e.g., via coupling 118 with a PC), wherein the data may be stored in a format with which a graphics program or an OCR program can work.

Such flatbed scanners are commonly available in the prior art, and examples of such prior art flatbed scanners include scanners commercially available from Hewlett-Packard, such as the scanners commercially marketed as "HP Scan-Jet" (e.g., models 3300Cse, 4200Cse, 6200Cse, and 6390C).

As described above, such prior art digital imaging devices have traditionally been relatively large in size, and therefore would generally consume a relatively large amount of surface area if placed on a desktop. Furthermore, such prior art digital imaging devices generally limit the types of original images that may be captured. For example, traditional prior art digital imaging devices, such as flatbed scanners, do not enable the capture of 3-dimensional ("3D") objects. For instance, the light source of such traditional digital imaging devices (e.g., light source 102 of FIG. 1) is typically focused at the place where the original image is intended to be placed on the platen (e.g., platen 106 of FIG. 1), and as an original is moved away from the platen surface (or has features that extend away from the platen surface) the light diminishes rapidly resulting in inability to accurately capture any portion that is removed from the platen surface (or the lens of the imaging device is otherwise unable to maintain the portion of the original that is removed from the platen surface in focus). Accordingly, traditional prior art digital imaging devices, such as flatbed scanners, have limited ability to capture 3D originals.

Also available in the prior art are hand-held scanners, which a user holds and manually translates across an original to capture a digital image of such original. While such hand-held scanners are space-efficient in that they do not require that a portion of a desktop surface, for example, be dedicated solely for such scanner, various problems are associated with the use of such hand-held scanners. Such problems arise primarily from the hand-held scanners* heavy reliance on the manual translation by a user in order to perform a scan. For example, the rate at which the user translates the scanner across an original is not fixed, and is therefore unpredictable. An inappropriate translation speed often results in distortions in a captured digital image. Use of such hand-held scanners are further problematic in that as a user scans an original, the user is necessarily covering up what the user is attempting to scan. Therefore, it is difficult for a user to accurately scan portions of an original because the original is covered as the user translates the scanner across such original. Also, as a user translates a hand-held scanner across an original, the user may apply too much pressure against the original and drag such original across the desktop.

More recently, digital document cameras have become commercially available. For example, a prior art digital document camera is commercially available from Canon, such as Canon's digital document camera model DZ-3600U. As with the more traditional digital imaging devices discussed above, such digital document cameras of the prior art typically include a platen on which an original document is placed. An example of a typical digital document camera 200 of the prior art is shown in FIG. 2. As shown, a light source 202 illuminates an original image (e.g., a piece of paper) that is placed face up on a platen 204 positioned substantially beneath a digital camera 206. Digital camera 206 may be a digital camera for capturing still images or it may be a video camera for performing video recording. Once digital camera 206 captures a digital image of the original placed on platen 204, the digital image may be stored in a computer, and the digital image may be transmitted from such a computer to others via a network (e.g., a WAN, LAN, the Internet, or an Intranet).

However, digital camera 206 generally provides a relatively low-resolution digital image of the original. For instance, digital document cameras of the prior art typically do not provide sufficient resolution to enable OCR operations, for example, as with the above-described flatbed scanners. As an example, Canon's digital document camera model DZ-3600U provides a resolution of 1900 pixels by 1424 pixels, which may provide an image that is legible to a user for text of 8 point font or larger, but is insufficient resolution for performing OCR operations or other types of imaging operations requiring greater resolution. Additionally, modifying digital camera 206 to enable an increase in the resolution of a captured image appears to be a relatively expensive proposition. That is, digital camera sensors that enable such a high resolution (e.g., three megapixels or more) are very expensive. As a comparison, to provide the equivalent resolution of a 300 dots per inch (dpi) scanner, which is a very low end scanner of the prior art, a digital document camera would need to have approximately an 8 to 10 mega-pixel camera. Accordingly, the resolution of digital document cameras of the prior art is very inferior to that of prior art scanners, and modifications required for a digital document camera to approach the resolution of prior art scanners are very expensive.

As with the above-described traditional digital imaging devices (e.g., flatbed scanners), digital document cameras are relatively large in size, and therefore generally consume a relatively large amount of surface area (e.g., of a desktop on which it is placed). For instance, a prior art digital document camera as described in conjunction with FIG. 2 having platen 204 would typically consume a relatively large amount of surface area on a desktop. While prior art digital document cameras may allow for the capture of a digital image of a 3D object (which is generally unavailable with more traditional digital imaging devices, such as flatbed scanners), the resolution of such digital document cameras is relatively poor. As described above, prior art digital document cameras typically capture a digital image having insufficient resolution for performing OCR operations or other types of imaging operations requiring greater resolution. Additionally, modifying such digital document cameras to enable an increase in the resolution of a captured image appears to be a relatively expensive proposition due to the relatively high cost of digital camera sensors.

Moreover, attempts to provide a suitable look-down digital imaging device that does not include the platen of the above-described digital document cameras (e.g., platen 204 of FIG. 2) in order to be more space-efficient have been disclosed in the prior art. For example, U.S. Pat. No. 5,227,896 issued to Takashi Ozawa entitled "IMAGE READER FOR PRODUCING AND SYNTHESIZING SEGMENTED IMAGE DATA" and U.S. Pat. No. 5,515,181 issued to Tetsuo Iyoda entitled "IMAGE READING APPARATUS PROVIDING HIGH QUALITY IMAGES THROUGH SYNTHESIS OF SEGMENTED IMAGE DATA" each disclose a look-down digital imaging device. However, the look-down digital imaging devices as disclosed in these patents capture multiple segments of an original image and then synthesize such segments to form a digital image of the original. Such capture of multiple segments and synthesis of the multiple segments is a relatively complex process. For instance, such digital imaging method is much more complex than the above-described digital imaging method typically utilized in flatbed scanners, which capture a single, congruent digital image thereby avoiding the synthesis of multiple image segments. As described above, look-down digital imaging devices, such as digital document cameras, generally have relatively poor resolution, as compared to that of typical flatbed scanners, for example. Thus, the relatively complex process of capturing multiple image segments and synthesizing such segments to form a digital image is performed in an attempt to overcome such limited resolution of prior art look-down digital imaging devices. Such added complexity to a look-down digital imaging device may substantially increase the production costs of such a look-down digital imaging device.

SUMMARY OF THE INVENTION

In view of the above, a desire exists for a look-down digital imaging device capable of capturing a relatively high resolution digital image of an original. For example, a desire exists for a look-down digital imaging device capable of capturing a digital image having a resolution comparable to that of traditional flatbed scanners. A further desire exists for look-down digital imaging device implemented in a manner to conserve work space area (e.g., on a desktop surface). Yet a further desire exists for a look-down digital imaging device capable of capturing a relatively high resolution digital image of an original without requiring that multiple segments of an image be captured and synthesized. Still a further desire exists for a look-down digital imaging device that may be cost efficient to produce.

These and other objects, features and technical advantages are achieved by a system and method which provide a look-down digital imaging device capable of capturing relatively high resolution digital images (e.g., comparable to traditional flatbed scanners) that may be implemented in a space-efficient manner. A preferred embodiment provides a look-down digital imaging device comprising a linear sensor for imaging a raster line of an original image placed substantially below the look-down digital imaging device, and a lens for focusing reflected light from the original to such linear sensor. In a preferred embodiment, the linear sensor functions much as in traditional flatbed scanners in that it captures a single, congruent digital image of a scanned original. Most preferably, the linear sensor is a high resolution sensor that enables a digital image to be captured having resolution comparable to that of traditional flatbed scanners. For instance, the linear sensor preferably enables capture of a digital image having a resolution no less than approximately 300 dpi. In fact, in one implementation, a known linear sensor as is commonly utilized in flatbed scanners is implemented within the look-down digital imaging device to enable a high resolution digital image to be captured. As a result, such linear sensor most preferably captures digital image data of a scanned original at sufficient resolution to permit optical character recognition operations to be performed on the captured digital image data.

In a most preferred embodiment, the look-down digital imaging device further comprises a digital video camera for capturing video data of a target scan area. Such video data may be fed in substantially real-time to a display (either included within the look-down digital imaging device or included on a device to which the look-down digital imaging device is coupled), which may aid a user in properly aligning an original within the target scan area. The look-down digital imaging device of a preferred embodiment may be implemented as a stand-alone device, or it may be coupled to another device, such as a computer (e.g., PC, laptop, personal data assistant) or an "appliance" device (e.g., WebTV or game console).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which:

FIG. 5 shows an exemplary flow diagram of user operations in performing a scan of an original image in a preferred embodiment; and FIG. 6 shows an exemplary flow diagram of a preferred look-down digital imaging device in performing a scan of an original image.

DETAILED DESCRIPTION

Figure 3:
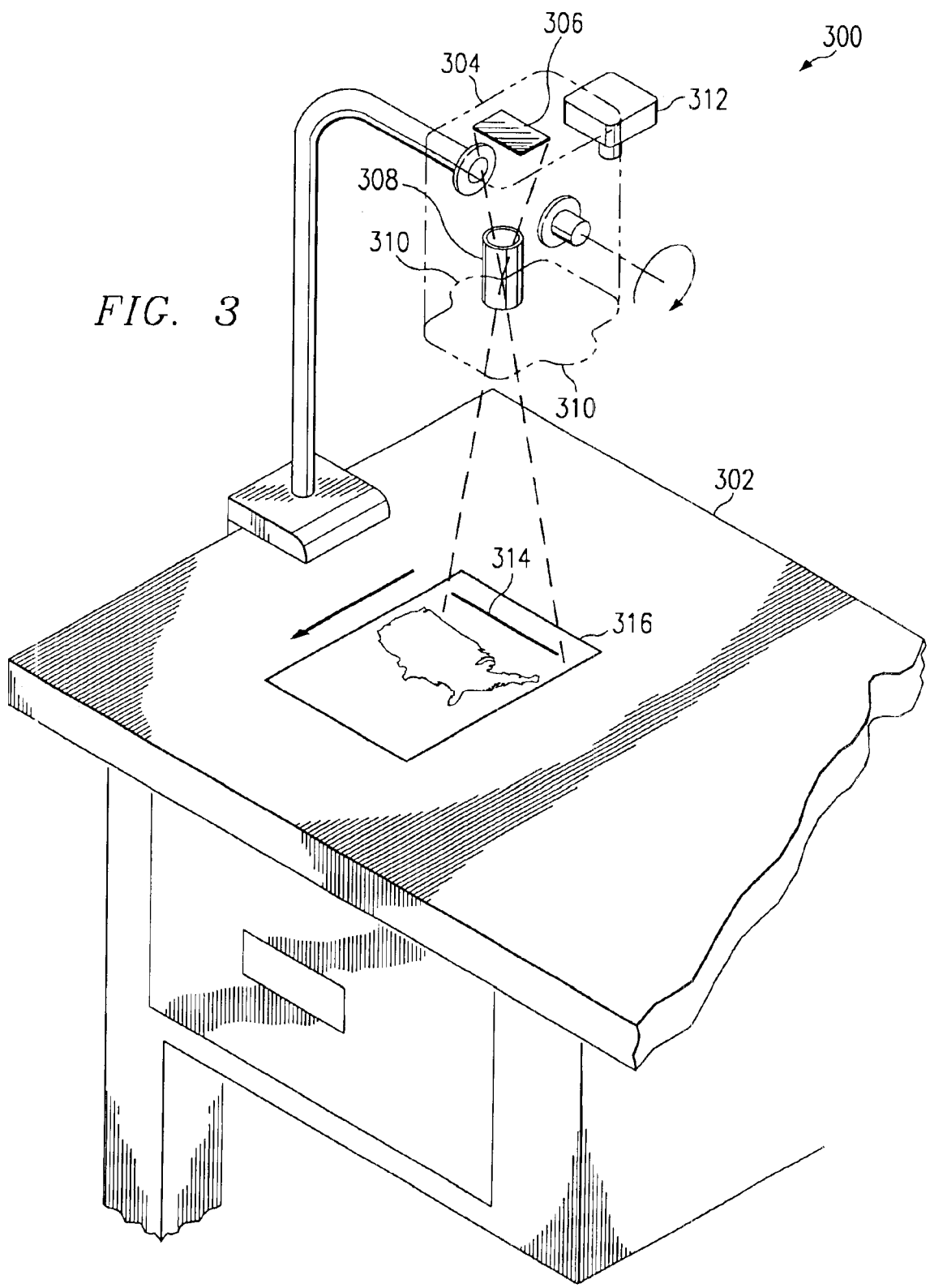
FIG. 3 shows a preferred embodiment of a look-down digital imaging device of the present invention.

Turning to FIG. 3, a preferred embodiment of a look-down digital imaging device of the present invention is shown. As shown a look-down linear array scanner ("LLAS") 300 is shown as suspended over a desktop (or other surface) 302. LLAS 300 may be coupled to a stand, frame, or other mechanism to support/position LLAS 300 over desktop 302. As an example, a stand similar to that commonly implemented for desk lamps may be included to support LLAS 300. Alternatively, LLAS 300 may be capable of being mounted to, as an example, a PC, for scanning an area below its mounted position. Thus, for instance, a user may mount LLAS 300 on the monitor of a the user's PC to enable scanning of a desktop surface beside such PC monitor. LLAS 300 of a preferred embodiment is implemented to enable digital imaging of an original image that is placed on the desktop 302 below LLAS 300. Accordingly, LLAS 300 is space-efficient in that it consumes very little or no surface space on desktop 302. That is, very little or no surface area (e.g., work space area) of desktop 302 is required to be dedicated solely for LLAS 300. For instance, because LLAS 300 does not require that a platen be included therewith (as with digital document cameras of the prior art), the desktop area below LLAS 300 is available for use as a regular desktop when not being used for scanning an original.

LLAS 300 comprises a housing 304 for housing components for performing digital imaging. LLAS 300 further comprises one or more light sources 310 for illuminating an original 316 that is placed on desktop 302. Included within housing 304 is a linear sensor (or "linear array") 306 for receiving light reflected from an original (e.g., page 316) and converting the light to electrical signals based on the intensity of the reflected light. Most preferably, linear sensor 306 utilizes a tri-liner color CCD array (or similar imaging technology) to provide a high resolution scan of an area of desktop 302 that is located below the LLAS 300. However, various embodiments may be implemented utilizing any suitable image pick-up device now known or later developed, and any such embodiments are intended to be within the scope of the present invention.

Figures 2, 4A, 4B:
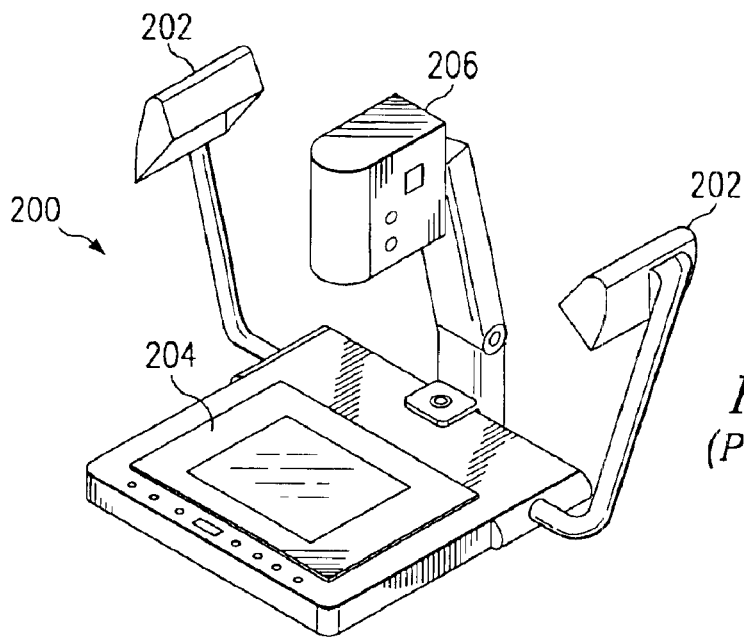
FIG. 2 shows an example of a typical digital document camera of the prior art.
FIG. 4A shows an exemplary implementation of a linear sensor for a color device.
FIG. 4B shows an exemplary implementation of an area array sensor for a color device.

As is well known in the art, a linear sensor (e.g., linear sensor 306) generally includes photosites arranged in substantially a straight line across the imaging device. For color devices, there are typically three lines, one for red, another for green, and another for blue. An exemplary implementation of such a linear sensor 400 for a color device is shown in FIG. 4A. It should be understood, of course, that various other implementations of a linear sensor are intended to be within the scope of the present invention. With such a linear sensor, each "exposure" captures a line across the original, which is typically referred to as a "raster line." It should be understood, however, that slight non-linearities (e.g., curves) may be included within a linear sensor for optical distortion reasons, and linear sensors including such non-linearities are intended to be encompassed by the use of "linear sensor" herein. It will be understood that a key characteristic of a linear sensor is that an image is captured via a line (i.e., a raster line) across the original.

"Area array sensors" are also available in the prior art, and are commonly utilized in digital cameras and digital document cameras. An exemplary implementation of an area array sensor 450 for a color device is shown in FIG. 4B. Such area array sensors have been commonly utilized in prior art look-down digital imaging devices, such as digital document cameras and the look-down digital imaging devices disclosed in U.S. Pat. Nos. 5,227,896 and 5,515,181, as examples. Such area array sensors generally include photosites that are arranged in a rectangular pattern, and each exposure captures an "area" of the original, rather than a line.

Also included within housing 304 of FIG. 3 is a lens 308, which focuses the received light reflected from an original (e.g., page 316) onto linear sensor 306. Preferably, lens 308 provides a reduction optics that reduces the original image on the desktop 302 (e.g., page 316) to an appropriate size for the linear sensor 306. For example, page 316 may be 8.5"

wide, and the reduction optics of lens 308 may reduce page 316 to the size of linear sensor 306, which may, for instance, be 1" or 2" wide. Lens 308 for providing suitable reduction optics and linear sensor 306 are well known in the pertinent art. In fact, a most preferred embodiment utilizes a lens 308 and a linear sensor 306 as are commonly utilized in flatbed scanners of the prior art, thereby enabling a cost-effective (i.e., relatively low production cost) LLAS 300. Thus, in a most preferred embodiment, well known, readily available digital imaging components (e.g., lens and linear sensor) that are commonly utilized in flatbed scanners are arranged within LLAS 300 to enable a look-down digital imaging device.

LLAS 300 images a narrow strip (which may be referred to herein as a "raster line) 314 of an original 316 that is located some inches below the LLAS 300. LLAS 300 then sweeps the raster line 314 over the scan area, thereby capturing an image of the original 316 placed on the scan area. Generally, the area that LLAS 300 sweeps with raster line 314 is fixed. However, all of the swept area may not be kept in the final digital image. For example, as discussed in greater detail below, a user may specify that only a portion of the swept area be kept in the final digital image. It should be recognized that the height may be different for different scans, and therefore the "sweep" may be limited to a smaller portion of the possible area to be scanned. Such sweeping of a raster line is similar in concept to that of traditional flatbed scanners. Of course, various alternative implementations of LLAS 300 may be provided in which LLAS 300 sweeps the raster line 314 over only a portion of the target scan area specified by a user to be captured as a digital image, for example. Additionally, various other implementations of LLAS 300 may sweep raster line 314 in any other desirable manner now known or later developed, and any such implementation is intended to be within the scope of the present invention.

Accordingly, in a preferred embodiment, LLAS 300 captures a digital image much like traditional digital imaging devices, such as flatbed scanners. Thus, rather than capturing multiple segmented images and combining such segmented images, as with the look-down imaging devices disclosed in U.S. Pat. Nos. 5,227,896 and 5,515,181, a preferred embodiment captures a digital image in a manner similar to flatbed scanners. That is, as with traditional flatbed scanners, LLAS 300 preferably captures a single, congruent image of an original. More specifically, LLAS 300 preferably sweeps raster line 314 across the original 316, thereby capturing a single, congruent digital image of such original 316. As a result, the scanning process may be less complex than required for a digital imaging device that captures multiple segments of an image and then combines such multiple segments. Furthermore, because the original is preferably captured as a single, congruent digital image, errors and other inaccuracies that may result from combining multiple segments of an original are eliminated. Thus, the digital image captured by LLAS 300 may be more accurate and more suitable for later processing, such as OCR operations.

As an example of the operation of such a preferred embodiment, a user would place original page 316 on an area below LLAS 300. The appropriate area on desktop 302 for placement of original page 316 may be indicated in a variety of ways. For instance, LLAS 300 may illuminate a target area on desktop 302 for proper placement of an original page 316. More particularly, a colored light (e.g., red) may be illuminated onto desktop 302 to provide an "X" or a rectangular box, as examples, to indicate the target area to be scanned by LLAS 300.

Alternatively, a video camera 312 may be included within LLAS 300, which when activated may capture the area to be scanned by LLAS 300. Video camera 312 may be a relatively low resolution, low cost video camera in order to reduce the production cost of LLAS 300. However, video camera 312 may be any suitable digital video camera now known or later developed, and inclusion of any such video camera within LLAS 300 is intended to be within the scope of the present invention. Video camera 312 may provide the captured video data to a computer (e.g., a PC, laptop, or personal data assistant), for example, which may in turn display the target area to be scanned by LLAS 300. As a further example, LLAS 300 may include a display thereon, to which video data from video camera 312 may be fed for display to a user. For instance, a small LCD display, which may even be a color display, such as is commonly included in digital cameras, video cameras, and personal data assistants (e.g., palm devices) may be included within LLAS 300 for displaying video output from video camera 312. In this manner, a user may refer to the video output being displayed by the user's computer monitor or a display included within LLAS 300, as examples, to properly align the original page 316 within the target area. More specifically, the user may adjust the original page 316, while video camera 312 provides a real-time video of the original page 316 in relation to the target area for scanning by LLAS 300. Accordingly, video camera 312 may provide a preview of the target scan area. Of course, when not being utilized for aligning an original for scanning, video camera 312 may also be utilized in any other suitable manner, such as for video conferencing, for example.

Not only may video feedback provided from video camera 312 be utilized for aligning an original within a target scan area, but it may assist a user in selecting a desired portion of original 316 for scanning. That is, video camera 312 may provide real-time video feedback to the user indicating the portion of original 316 to be scanned. Thus, the user may arrange original 316 to scan only a desired portion. Additionally, as discussed in greater detail below, selecting portion(s) of original 316 for scanning may be performed in a variety of methods beyond a user manually adjusting the original based on video feedback from video camera 312. Video feedback from video camera 312 also allows the user to view the quality of the image to be scanned. For instance, one challenge with look-down digital imaging devices, including prior art digital document cameras, is potential glare spots appearing on original 316 from light sources 310, which may cause an inaccurate captured digital image of original 316. It is generally technically difficult to resolve such glare problems within the look-down scanner itself, e.g., with sophisticated imaging systems utilizing strobes or other methods in an attempt to remove a glare. However, video feedback from video camera 312 may enable a user to recognize glare spots on original 316, and the user may in response take some action to remove such glare spots before scanning the original, such as adjusting light sources 310 or shading the glare spot area (e.g., with the user's hand). As a result, the user may preview the video feedback of original 316 to ensure that a high quality digital image of original 316 is captured by LLAS 300. It should be understood that most preferably, video camera 312 is aligned in relatively close proximity to linear sensor 306 to provide video feedback that is consistent with the image data to be captured by linear sensor 306.

Once the original page 316 is properly positioned for scanning by LLAS 300, the user may request a scan of such original page 316. LLAS 300 may be implemented to enable a user to request a scan through any one or more of various methods. For example, a button may be included on LLAS 300 for activating LLAS 300 to scan original 316. As another example, LLAS 300 may include voice recognition technology to recognize a verbal command from a user to activate LLAS 300 to scan original 316. As a further example, LLAS 300 may be coupled to a computer (e.g., a PC, laptop, or personal data assistant), as discussed in greater detail below, and a user may input a command to such computer using any input method for such a computer that is now known or later developed, including without limitation a keyboard, a mouse, and a verbal command, to activate LLAS 300 to scan original 316. When a scan is requested, light sources 310 illuminate original page 316 and LLAS 300 sweeps imaged raster line 314 down the original page 316 at a rate corresponding to, for example, 300 pixels per inch (ppi). It should be recognized that LLAS 300 may be implemented to sweep imaged raster line 314 at a rate corresponding to any desired ppi, and any such implementation is intended to be within the scope of the present invention. As discussed more fully below, such sweeping of imaged raster line 314 may be accomplished in a number of ways. As examples, housing 304 (including the linear sensor 306, lens 308, light sources 310 and other associated circuitry) may pivot about an axis and/or translate vertically and/or horizontally relative to desktop surface 302 in order to achieve such a sweeping of imaged raster line 314 across original 316.

Before performing a scan of an original (or periodically) it may be desirable to calibrate LLAS 300. Calibration is commonly performed in traditional digital imaging devices of the prior art, such as flatbed scanners, but is not commonly included within look-down digital imaging devices, such as digital document cameras of the prior art. More specifically, flatbed scanners typically include an area that is utilized for calibration. Generally, before such flatbed scanners perform a scan of a document, they essentially scan their calibration areas, and then based on the scan data obtained for the known calibration area, the scanner adjusts/corrects for defects, such as variations of illumination, sensors, sensitivity, pixel errors, etcetera. However, look-down digital imaging devices, such as digital document cameras, typically do not include such a calibration area. It is generally desirable to enable calibration of such look-down digital imaging devices in order to allow for an accurate digital image having sufficient resolution for performing OCR operations thereon, for example. Accordingly, a most preferred embodiment includes a calibration mechanism as disclosed in concurrently filed and commonly assigned U.S. patent application Ser. No. entitled "METHOD AND SYSTEM FOR CALIBRATING A LOOK-DOWN LINEAR ARRAY SCANNER UTILIZING A FOLDED OPTICAL PATH," the disclosure of which is hereby incorporated herein by reference. Of course other calibration methods may be utilized within LLAS 300, and any suitable calibration method now known or later developed for a look-down digital imaging device is intended to be within the scope of the present invention. LLAS 300 may be calibrated before each scan or periodically, as examples, to aid in obtaining a high quality digital image of original 316.

Figure 1:
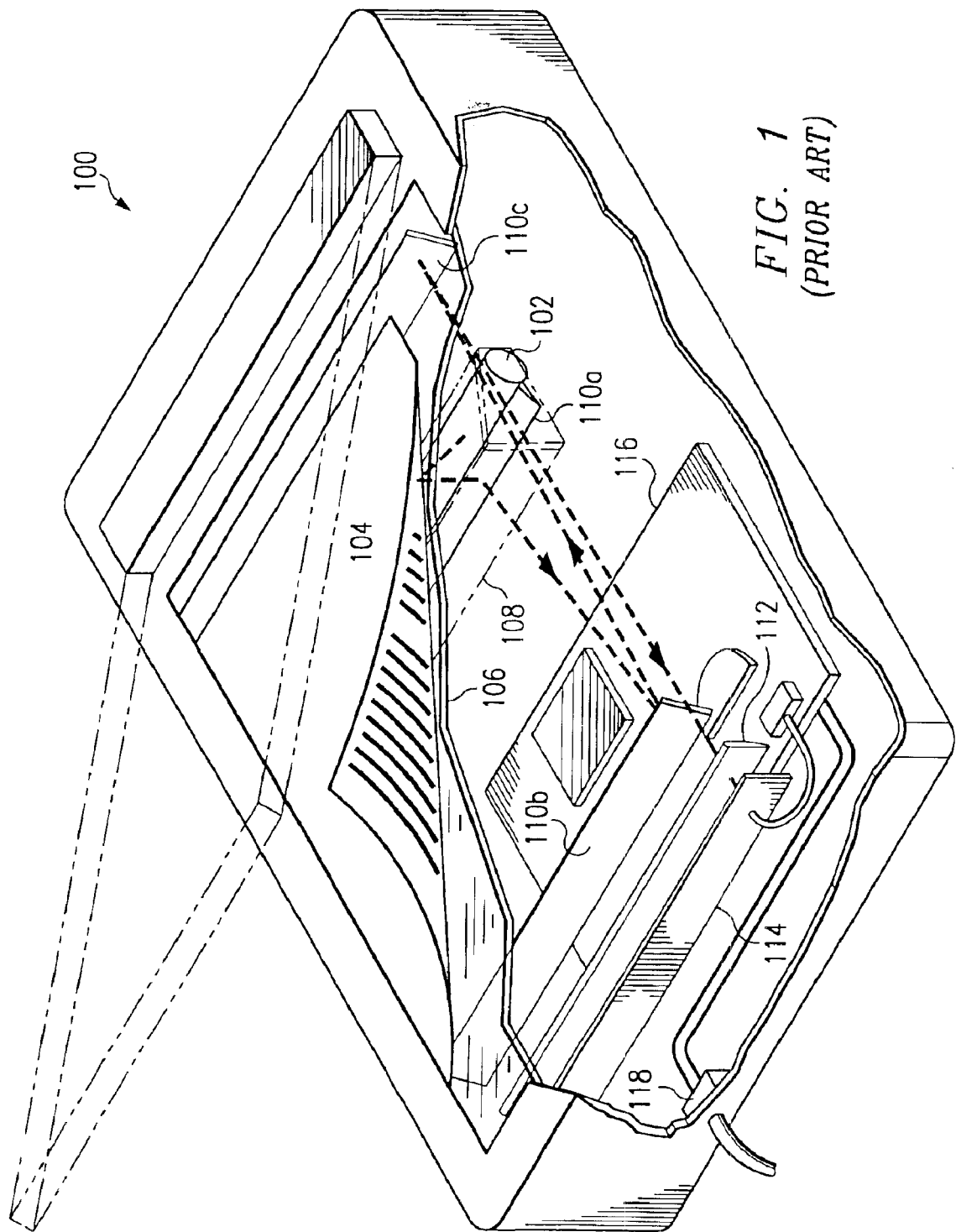
FIG. 1 shows an example of a typical flatbed scanner of the prior art.

As discussed above, LLAS 300 is most preferably implemented with existing digital imaging technology commonly utilized in flatbed scanners. Such an implementation is advantageous because well known, readily available digital imaging components may be utilized, thereby decreasing the production cost of the LLAS 300. Most preferably, known digital imaging technology of flatbed scanners is utilized within LLAS 300 by "unfolding" the folded optical path of such flatbed scanners. As described above in conjunction with FIG. 1, flatbed scanners typically include a series of mirrors which direct the light reflected from an original in a manner that "folds" the reflected light. For example, in FIG. 1, reflected light is directed from mirror $110_A$ to mirror $110_B$, which directs the light to mirror $110_C$, which in turn directs the to lens 112. Thus, the mirrors $110_A$, $110_B$, and $110_C$ are arranged to direct the reflected light in a manner that "folds" such light along a path within the flatbed scanner 100. Accordingly, flatbed scanner 100 of FIG. 1 utilizes what is commonly referred to as a folded path optical system. By removing mirrors $110_A$, $110_B$, and $110_C$ from the optical path of scanner 100, the optical path may be unfolded, resulting in a path that is approximately 20" long, for example. Accordingly, the unfolded optical path corresponds nicely to a height that may be implemented for a look-down digital imaging device, such as LLAS 300, above a desktop (or other surface) 302. As a result, LLAS 300 may be implemented muck like a traditional flatbed scanner, but having an unfolded optical path.

As discussed briefly above, LLAS 300 preferably sweeps an image raster line 314 across an original 316 to scan in all or a portion of such original 316. As indicated in FIG. 3, LLAS 300 may be mounted to a support member (e.g., stand) in a manner such that LLAS 300 is capable of pivoting about an axis in order to sweep image raster line 314 across original 316. Alternatively, LLAS 300 may be movably coupled to a support frame, such that LLAS 300 is capable of translating along such a support frame horizontally (or laterally) with respect to the desktop 302 (or original 316) in order to sweep image raster line 314 across original 316. However, such a support frame for translating horizontally with respect to desktop 302 may consume an undesirably large amount of surface area on desktop 302. Accordingly, in a most preferred embodiment, LLAS 300 pivots about an axis to sweep image raster line 314 across original 316.

It should be recognized that pivoting LLAS 300 about an axis in order to sweep image raster line 314 across original 316 may result in a perspective view of portions of the original 316. For instance, as LLAS 300 pivots, it may be farther from the desktop 302 at some point of the pivot than it is at another point of the pivot. To reduce the effect that such a pivot has on the resulting scanned image, LLAS 300 may translate vertically relative to the desktop 302 as LLAS 300 pivots in order to allow for an appropriate view of original 316 to be captured by LLAS 300. That is, adjusting the height of LLAS 300 relative to desktop 302 as LLAS 300 pivots may aid in capturing an appropriate digital image of original 316. Additionally or alternatively, software may be included to "clean up" the captured digital image. For instance, software may be utilized to correct for a known image inaccuracy (e.g., perspective view) resulting from the pivot of LLAS 300. Because the movement (e.g., pivoting and/or translation) of LLAS 300 is under the control of a fixed system, the resulting scan may be much more accurate than is typical with traditional handheld scanners, for example.

Furthermore, lens 308 may provide zoom capabilities to enable a user to zoom in/out respective to original 316. Accordingly, if the user desired to scan a larger area of desktop 302, the user could zoom out, and if the user desired to scan a relatively small original 316 (or an original with relatively small features or small font), the user could zoom in on such small original 316. Traditional digital imaging devices, such as flatbed scanners, do not provide such flexibility in zooming out to scan a relatively large original 316. Instead, a user may be required to perform two (or more) separate scans and then scanner (or the user) may then attempt to combine the captured digital images. Therefore, a preferred embodiment of the look-down digital imaging device of the present invention may provide much more flexibility in zooming in/out respective to an original to capture a desired image.

A most preferred embodiment of the present invention enables a user to select (or indicate) desired portions of an original to be scanned, and then only capture the desired portions of such original as a digital image. For example, a user may desire to capture only a particular paragraph or particular sentence of an original 316, or otherwise capture only a portion of an original 316. Various methods may be utilized for indicating a desired portion of an original to be captured, and any method now known or later developed for indicating such a desired portion is intended to be within the scope of the present invention. As one example, once an original (e.g., original 316) is displayed on a computer monitor or display of LLAS 300, as examples, a user may utilize an input mechanism to highlight desired portion(s) of the displayed original, and LLAS 300 may then only capture such desired portion(s). As a further example, LLAS 300 may include technology for recognizing a moving indicator (e.g., a moving pointer or a user's finger) moving across original 316 as indicating a desired portion of such original 316 to be captured. For instance, a user may move the user's finger (or a pointing device) across a desired portion of original 316, and LLAS 300 may recognize such movement as indicating a desired portion and capture only such desired portion of original 316 upon a scan request. Any suitable technology now known or later developed for recognizing such movement may be implemented within LLAS 300, and any such technology is intended to be within the scope of the present invention. Of course, as LLAS 300 recognizes such desired portion to be scanned, the desired portion may be displayed on a computer or an associated display of LLAS 300 to enable a user to ensure that the desired portion has been accurately recognized by LLAS 300 before actually capturing such portion.

It should be recognized that, as with traditional digital imaging devices, such as flatbed scanners, LLAS 300 may be coupled to a computer (e.g., a PC, laptop, personal data assistant, etc.) for transfer of data/commands therebetween. More particularly, linear sensor 306 and video camera 312 may both be coupled to a separate computer device. Alternatively, LLAS 300 may be implemented as a standalone look-down digital imaging device that is not required to be coupled to a computer in order to capture a digital image of an original. For example, LLAS 300 may include an internal memory for storage of captured digital image data and/or may include a floppy drive or writeable CD-ROM drive to enable a user to write captured digital image data to a floppy disk or CD disc. LLAS 300 may further include software for cleaning a captured digital image, as discussed above, and a processor for executing such software. LLAS 300 may further include appropriate input devices (e.g., pointing device, buttons, voice recognition device, etcetera) to enable a user to interact with LLAS 300 for capturing an original as desired. Additionally, such stand-along look-down digital imaging device may further include a port for connecting to a network and/or for connecting to other "appliances" (e.g., any non-PC host device, such as Web TV or game consoles).

Turning now to FIG. 5, an exemplary flow diagram for operational steps of a user of a look-down digital imaging device of a preferred embodiment is provided. As shown, at block 502 a user first places/adjusts an original in a target scan area. As described above, such a target scan area may be indicated by a colored light illuminating a target area of the desktop surface or a user may reference video feedback from video camera 312, as examples. Once an original is appropriately positioned, a user may select portion(s) of the original to be captured by LLAS 300 at block 504. As described above, a user may indicate a desired portion of an original by highlighting such desired portion on a display or moving a pointer (e.g., the user's finger) across the desired portion, as examples. At block 506, the user may adjust the image view quality based, for example, on video feedback of the original. For example, the user may zoom in/out, adjust the light sources to correct for glares on the original, or take other actions to improve the quality of the digital image to be captured of the original. At block 508, the user may indicate where LLAS 300 is to save a captured digital image. For example, as described above, various options for saving captured data may be available, such as to an associated computer device to which LLAS 300 is coupled, to internal memory of LLAS 300, or to a floppy drive or writeable CD-ROM drive of LLAS 300, as examples. Thereafter, at block 510, the user may request a scan of the original by LLAS 300, which activates LLAS 300 to capture a digital image of such original (or desired portions of such original).

Turning now to FIG. 6, an exemplary flow diagram for operation of a look-down digital imaging device of a preferred embodiment (e.g., LLAS 300 of FIG. 3) is provided. More particularly, the exemplary operational steps of FIG. 6 may be performed by a look-down digital imaging device of a preferred embodiment when a scan is requested by a user. As shown, at block 602 the light sources of the look-down digital imaging device illuminate the original to be scanned. At block 604, the digital imaging device sweeps an image raster line across the original to capture at least portions of such original as selected by the user. At block 606, the linear sensor array of the digital imaging device captures the resulting image data from the sweep of block 604. Of course, it will be recognized by those skilled in the art that such a capture of block 606 is performed substantially simultaneously with the sweep of block 604. At block 608, the look-down digital imaging device writes the captured digital image data to memory (e.g., to an internal memory, memory of an associated computer to which the digital imaging device is coupled, floppy drive, etc.). Additionally, software may be utilized to then "clean" the captured digital image to correct for known inaccuracies resulting from the sweep of the original.

As described above, LLAS 300 may have a shape and size similar to a typical desk lamp. Moreover, light sources 310 of LLAS 300 may be utilized to enable LLAS 300 to act as an ordinary desk lamp when not being used as a look-down digital imaging device. Most preferably, linear sensor 306 has sufficient sensitivity such that light intensity of a typical desk lamp may be sufficient for scanning an original 316. For example, light sources 310 may be a 7 watt or 15 watt, as examples, flourescent lamp to provide sufficient light intensity for capturing a digital image of original 316. Therefore, LLAS 300 may provide further flexibility and further conserve desktop space by also serving as a desk lamp.

It should be understood that original 316 of FIG. 3 is not intended to be limited to a page, but may instead be any type of original. In fact, a most preferred embodiment of the look-down digital imaging device of the present invention enables 3D objects to be accurately captured as a digital image. Furthermore, desktop 302 of FIG. 3 is not intended to be limited to an actual desktop, but may instead be any suitable surface on which the look-down digital imaging device of a preferred embodiment may be placed.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of digital imaging utilizing a look-down digital imaging device to form a resulting high-resolution digital image, said method comprising:
   illuminating a target scan area below said look-down digital imaging device;
   capturing video data of said target scan area;
   displaying said captured video data on a display; and
   sweeping an image raster line once across said target scan area, thereby capturing said resulting high-resolution digital image of an original object.

2. The method of claim 1 wherein said captured resulting high-resolution digital image of said original object is a single, congruent digital image of said original object.

3. The method of claim 1 further comprising:
   performing optical character recognition operations on said captured resulting high-resolution digital image data of said original object.

4. The method of claim 1 wherein said high resolution is no less than approximately 300 dpi.

5. The method of claim 1 further comprising:
   selecting at least a portion of said original object to be captured as said resulting high-resolution digital image.

6. The method of claim 5 wherein said look-down digital imaging device recognizes said at least a portion of said original object to be captured as that portion over which an indicator is moved.

7. The method of claim 1 wherein said sweeping is achieved by at least one movement selected from the group consisting of:
   pivoting said look-down digital imaging device about an axis, pivoting said look-down digital imaging device about an axis and translating look-down digital imaging device vertically relative to said target scan area during said pivoting, and translating said look-down digital imaging device laterally relative to said target scan area.

8. The method of claim 1 wherein said sweeping an image raster line once across said target scan area, thereby capturing said resulting high-resolution digital image of an original object, comprises:
   sweeping said image raster line once across said target scan area, thereby capturing said resulting high-resolution digital image of an original object by a linear sensor.

9. The method of claim 1 wherein said capturing said resulting high-resolution digital image of an original object comprises:
   capturing said high-resolution digital image by a linear sensor that receives a non-folded optical path of light reflected from said original object.

10. The method of claim 1 wherein said displaying said captured video data on a display comprises:
    displaying a video preview of the target scan area before said capturing of said sweeping step.

11. The method of claim 10 further comprising:
    determining from said video preview when said original object is aligned in said target-scan area as desired; and
    upon determining that said target scan area is aligned as desired, triggering said sweeping step.

12. The method of claim 1 wherein said capturing video data of said target scan area and displaying said captured video data on a display comprises:
    displaying real-time video feedback of the target scan area.

13. The method of claim 12 further comprising:
    using the video feedback for aligning the original object as desired within the target scan area.

14. The method of claim 12 further comprising:
    using the video feedback for previewing the quality of image to be captured upon performing said sweeping.

15. The method of claim 14 wherein said previewing the quality of image comprises recognizing any undesired glare spots present on the original object.

16. A look-down digital imaging device comprising:
    linear sensor for imaging a raster line of an object placed substantially below said look-down digital imaging device; and
    lens for focusing reflected light from said object to said linear sensor, wherein said linear sensor receives a non-folded optical path of light reflected from said object.

17. The look-down digital imaging device of claim 16 wherein said linear sensor comprises a tri-liner color CCD array.

18. The look-down digital imaging device of claim 16 wherein said linear sensor is a high resolution sensor that captures digital image data of said object at resolution no less than approximately 300 dpi.

19. The look-down digital imaging device of claim 16 wherein said linear sensor is a high resolution sensor that captures digital image data of said object at sufficient resolution to permit optical character recognition operations to be performed on said digital image data.

20. The look-down digital imaging device of claim 16 further comprising a digital video camera for capturing video data of said object.

21. The look-down digital imaging device of claim 20 further comprising a display, wherein said digital video camera and said display provide real-time video feedback of a target scan area.

22. The look-down digital imaging device of claim 21 further comprising:
    said real-time video feedback providing a reference for aligning the object as desired within the target scan area.

23. The look-down digital imaging device of claim 21 further comprising:
    said real-time video feedback providing a preview of the quality of image to be captured by said linear sensor.

24. The look-down digital imaging device of claim 23 wherein said preview of the quality of image includes displaying glare spots present on the object.

25. The look-down digital imaging device of claim 20 further comprising a display for displaying a video preview of a target scan area before said linear sensor imaging said raster line.

26. The look-down digital imaging device of claim 16 implemented as a stand-alone device.

27. The look-down digital imaging device of claim 16 wherein said linear sensor sweeps said image raster line across said target scan area only once for capturing a desired image of said object.

28. A system for performing digital imaging comprising:

a look-down digital imaging device that includes means for imaging a raster line over a target scan area, means for focusing reflected light from said target scan area to said imaging means, and means for capturing video data of said target scan area for providing a video preview of the target scan area before said imaging means captures an image of said target scan area.

29. The system of claim 28 wherein said means for imaging is a high resolution linear sensor.

30. The system of claim 29 wherein said high resolution is resolution no less than approximately 300 dpi.

31. The system of claim 28 wherein said means for imaging a raster line over said target scan area sweeps said raster line once over said target scan area for capturing a final image of an original object at a desired resolution.

32. The system of claim 28 wherein said means for capturing video data of said target scan area for providing a video preview of the target scan area captures real-time video of said target scan area.

33. The system of claim 28 further comprising:

means for displaying said captured video data as a reference for aligning an object as desired within the target scan area.

34. The system of claim 28 further comprising:

means for displaying said captured video data as a preview of the quality of image to be captured by said imaging means.

35. The system of claim 34 wherein said preview of the quality of image includes displaying glare spots present on the target scan area.

36. The system of claim 28 wherein said imaging means receives a non-folded optical path of light reflected from said target scan area.

37. A system comprising:

a look-down digital imaging device that includes a linear sensor, wherein said look-down digital imaging device is operable to sweep a raster line across a target area of an original object placed substantially below said look-down digital imaging device to capture an image of said target area by said linear sensor;

a digital video camera for capturing video data of said target area; and a display for displaying the captured video data.

38. The system of claim 37 wherein the digital video camera captures the video data of said target area and said display displays the captured video data to provide a preview of the target area to be imaged by the look-down digital imaging device before said look-down digital imaging device capturing said image of said target area.

39. The system of claim 38 wherein said digital video camera provides real-time video feedback to said display of the target area.

40. The system of claim 38 wherein said display outputs video as a reference for aligning said original object within the target area as desired.

41. The system of claim 38 wherein said display outputs video as a preview of quality of image of said original object to be captured by said linear sensor.

42. The system of claim 41 wherein said preview of quality of image includes displaying glare spots present on the original object.

43. The system of claim 37 wherein said linear sensor is a high-resolution sensor that captures said image of said target area at a resolution no less than 300 dpi.

44. The system of claim 37 further comprising:

processor-based device operable to receive the captured image of said target area and perform optical character recognition operations on said captured image.

45. The system of claim 37 wherein said look-down digital image device sweeps said raster line across said target area of said original object only once for capturing said image of said target area.

46. The system of claim 45 wherein said target area is the area of said original object desired to be captured as a final resulting image.

47. The system of claim 37 wherein said linear sensor receives a non-folded optical path of light reflected from said target area.

48. A method of capturing a digital image of an object using a look-down digital imaging device, said method comprising:

capturing real-time video data of a target scan area below said look-down digital imaging device;

displaying said captured real-time video data of the target scan area on a display;

arranging an object to be imaged on said target scan area;

referring to said video data displayed on said display to determine if said object is arranged as desired for imaging;

once the object is determined to be arranged as desired, triggering capture of a still image of said object; and responsive to said triggering, capturing said still image by a linear sensor by sweeping a raster line over the target scan area once resulting in capture of said still image of said object having resolution of at least 300 dpi.

49. The system of claim 48 wherein said capturing further comprises:

receiving at said linear sensor a non-folded optical path of light reflected from said target scan area.

* * * * *

UNITED STATES PATENT AND TRADEMARK OFFICE
CERTIFICATE OF CORRECTION

PATENT NO.        : 6,965,460 B1
APPLICATION NO. : 09/635479
DATED             : November 15, 2005
INVENTOR(S)       : Robert G Gann et al.

It is certified that error appears in the above-identified patent and that said Letters Patent is hereby corrected as shown below:

In column 10, line 21, delete "muck" and insert -- much --, therefor.

In column 11, line 62, delete "stand-along" and insert -- stand-alone --, therefor.

In column 14, line 14, in Claim 11, delete "target-scan" and insert -- target scan --, therefor.

In column 16, line 53, in Claim 49, delete "system" and insert -- method --, therefor.

Signed and Sealed this

Twelfth Day of May, 2009

JOHN DOLL
*Acting Director of the United States Patent and Trademark Office*